April 7, 1931.  S. A. WALLACE  1,799,714
ELECTRIC GRASS CUTTER
Filed Feb. 18, 1929  2 Sheets-Sheet 1
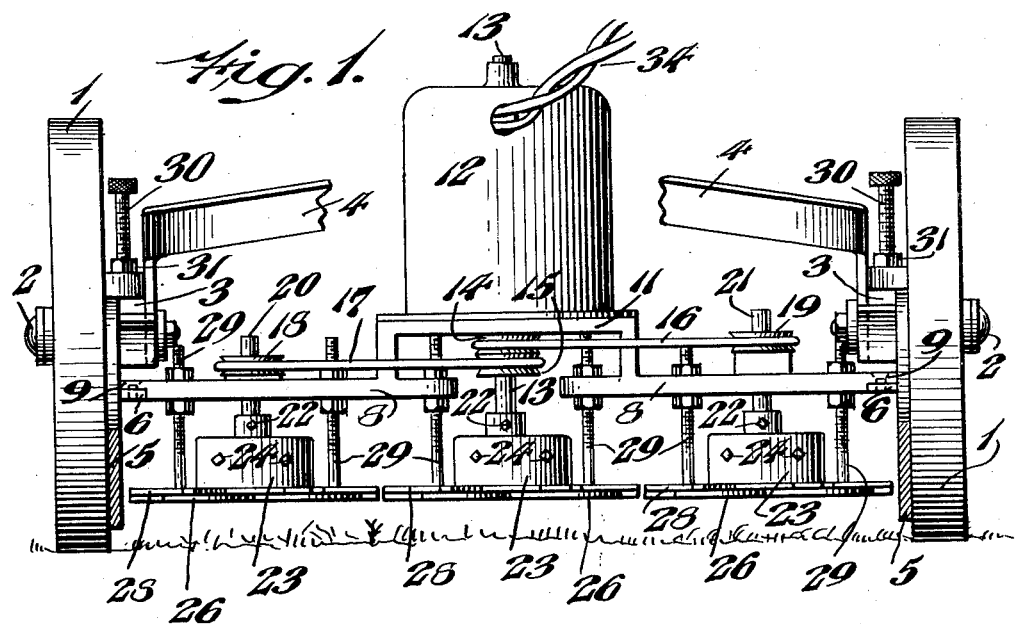
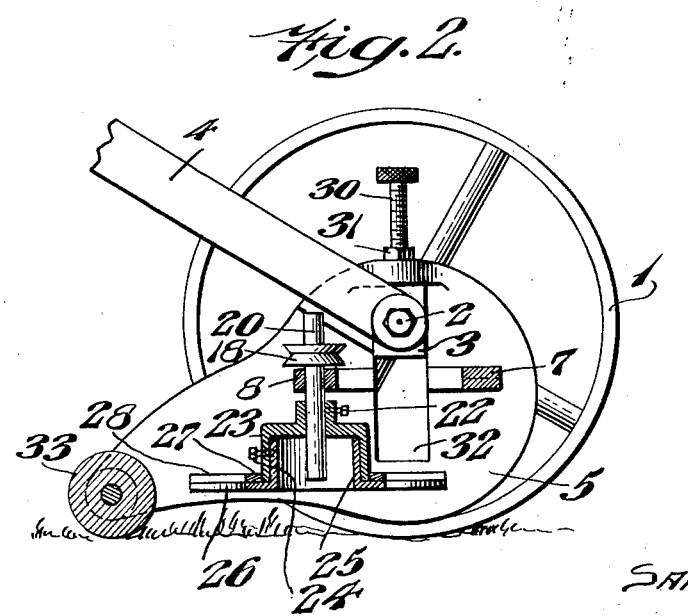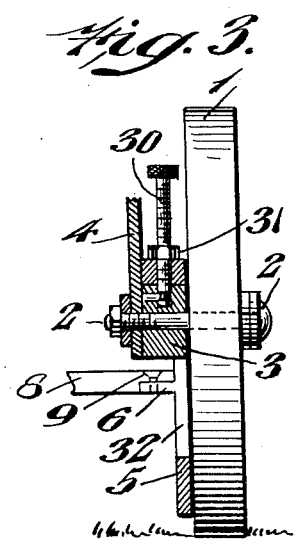
INVENTOR.
SAMUEL A. WALLACE
BY
ATTORNEY April 7, 1931.  S. A. WALLACE  1,799,714
ELECTRIC GRASS CUTTER
Filed Feb. 18, 1929   2 Sheets-Sheet 2

INVENTOR.
SAMUEL A. WALLACE,
BY
William J. Jackson
ATTORNEY

Patented Apr. 7, 1931

1,799,714

UNITED STATES PATENT OFFICE

SAMUEL A. WALLACE, OF WOODBURY HEIGHTS, NEW JERSEY

ELECTRIC GRASS CUTTER

Application filed February 18, 1929. Serial No. 340,738.

This invention, generally stated, relates to grass cutters or lawn mowers and has more especial relation to grass cutters or lawn mowers which may be electrically operated.

The primary object of the present invention is to provide an electrically driven lawn mower which may receive its electrical energy from a commercial line, the driving parts to be effective in rotating a plurality of horizontally arranged knives movable about vertical axes.

A further object of the present invention is to provide a lawn mower of the character stated in which the knives are carried by a frame which is vertically adjustable with respect to the traction wheels of the mower.

A still further object of the present invention is to provide a lawn mower of the character stated in which the plurality of horizontally arranged cutting blades are each vertically adjustable with respect to the carrier frame.

A further object of the present invention is to provide an arrangement, construction, connection and combination of parts for attaining the results sought in the foregoing objects.

The invention consists of the novel construction hereinafter described and finally claimed.

The nature, characteristic features and scope of the invention will be more fully understood from the following description taken in connection with the accompanying drawings forming part hereof, and in which:

Fig. 1 is a view in front elevation of a lawn mower or grass cutter embodying the invention.

Fig. 2 is a view in cross section of Fig. 1.

Fig. 3 is a fragmentary view partly in elevation and partly in section illustrating a detail of construction hereinafter referred to.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 4:
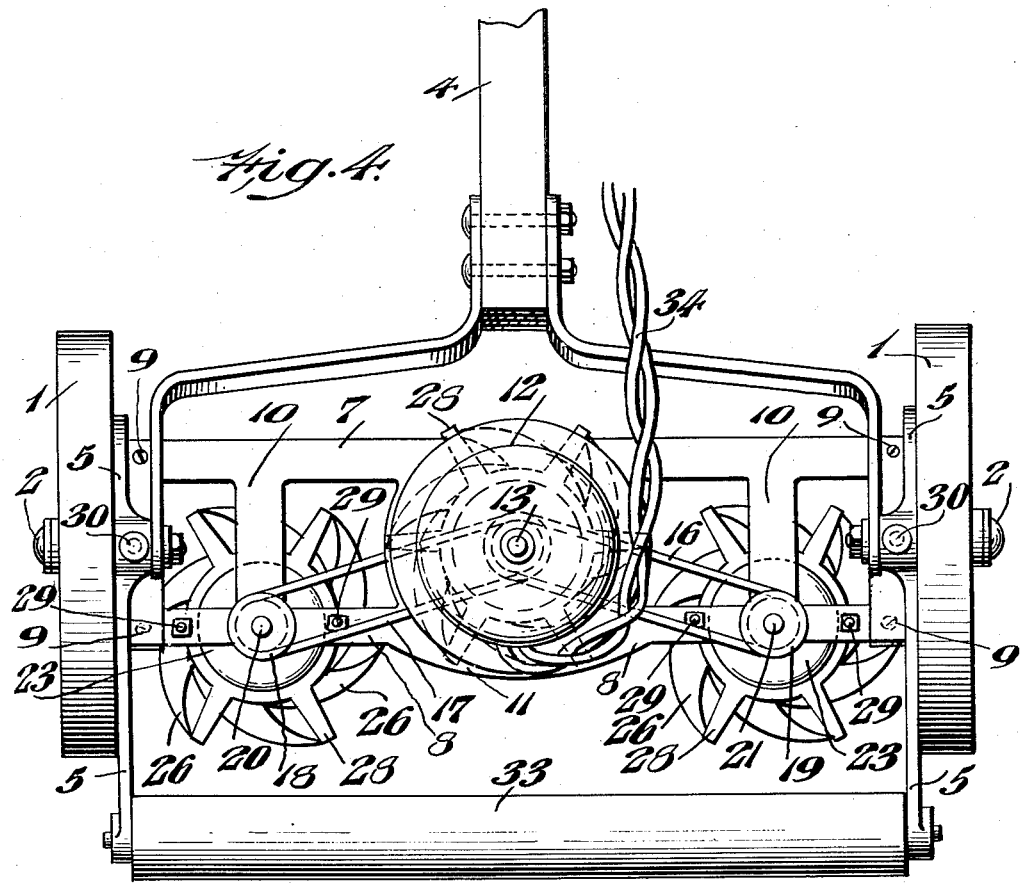
Fig. 4 is a top or plan view of the lawn mower shown in the foregoing figures.
Figure 6:
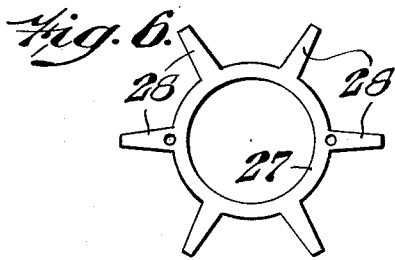
Fig. 6 is a top or plan view of one of the cutter guards shown in Fig. 4.
Figure 5:
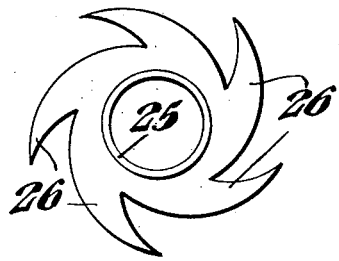
Fig. 5 is a top or plan view of one of the rotary cutters shown in Fig. 4.

Referring to the drawings in detail, the reference numeral 1 designates the traction wheels of the lawn mower. Carried by the stub axles 2 thereof are frames 3. Having pivotal connection with the stub axles 2 is the handle 4 for manual operation of the mower which handle is of conventional form. Movable vertically with respect to each frame 3 is a member 5 provided with a pair of laterally extended lugs 6. Attached to and spanning the lugs 6 is a fixed frame comprising a pair of horizontally arranged arms 7 and 8, which frame is secured to the lugs 6 by means of screws 9. The arms 7 and 8 are connected by means of struts 10 to provide strength and rigidity. The forward arms 8 are not continuous and their central adjacent ends are connected by means of an upwardly extended motor support 11 which, considered in plan, is substantially circular in configuration. This support 11 is arranged to receive a conventional electrical motor 12. The shaft 13 of the motor, which is vertically disposed, is provided with a pair of pulleys designated 14 and 15. These pulleys 14 and 15 are connected by belts 17 and 16 with other pulleys 18 and 19, which pulleys 18 and 19 are carried respectively by vertically disposed shafts 20 and 21, said shafts being rotatable in the arm 8 of the horizontally disposed frame as carried by the lugs 6. Each of the shafts 13, 20, and 21 has adjustably fixed thereto as by screws 22 a casing 23. Each casing 23 has fixed thereto by means of set screws 24 a rotary blade. Each blade comprises a sleeve 25 fitted within a casing 23 and is provided at its lower portion with a plurality of cutting blades 26, see Fig. 5. These cutters 26 provide a plurality of blades each formed upon arcs of circles and in effect, and considered in plan, provide a structure resembling a ratchet wheel. Arranged above each cutter and separated by a casing 23 is a guard 27 provided with prongs 28, see Fig. 6. The cutting blades 26 cooperating with the members 28 in the rotation of the cutters function to sever or cut grass as is apparent. In order to adjust the guards 27 use is made of the rods and nuts 29. Thus, the cutters 26 may be vertically adjusted and the guards may be vertically adjusted one independently of the other, since each has its own means of adjustment.

The frame composed of the arms 7 and 8 may also be vertically adjusted independently of the cutter and guards in the following manner: The fixed frames 3 carried by the axles 2 are provided with grooves to receive the lower ends of vertical adjusting screws 30, which screws are provided with lock nuts 31. By proper adjustment the frames 5 may be moved toward or away from the ground by reason of the slot 32 in the frame 3. Thus, since the frames 5 may be moved upwardly and downwardly the entire frame composed of the arms 7 and 8 may be moved upwardly or downwardly irrespective of any individual adjustment of the cutters 26. The reference numeral 33 designates the conventional roller as carried by the frame 5. It will be understood that the motor 12 is equipped with conventional conductors 34 for attachment to a commercial electrical line, as a house circuit.

What I claim is:

1. In a lawn mower, wheels including stub axles, vertical end frames mounted upon said axles, a horizontally disposed cross frame made non-continuous and arranged between and carried by the side end frames, a motor plate bridging said cross frame parts, a motor supported upon said plate, a horizontally disposed main cutter, a plurality of auxiliary cutters arranged in horizontal alignment with said main cutter, and means connected to said motor and cutters for simultaneously driving the latter.

2. In a lawn mower, wheels including stub axles, vertical end frames mounted upon said axles, a horizontally disposed cross frame made non-continuous and arranged between and carried by the side end frames, a motor plate bridging the central gap as formed by the frame parts, a motor supported upon said plate, a horizontally disposed main cutter having a shaft passing vertically through said motor plate, a plurality of auxiliary cutters arranged in horizontal alignment with said main cutter, means connected to said motor and cutters for simultaneously driving the latter, and means for adjusting said frame.

3. In a lawn mower, wheels including stub axles, vertical end frames mounted upon said axles, a horizontally disposed non-continuous cross frame arranged between and carried by the side end frames, a motor plate bridging the central gap formed by the frame parts, a motor supported upon said plate, a horizontally disposed main cutter having a shaft passing vertically through said motor plate, a plurality of auxiliary cutters arranged in horizontal alignment with said main cutter, means connected to said motor and cutters for simultaneously driving the latter, means including set screws and lock nuts for adjusting said frame, and means for adjusting said cutters vertically and independently of said frame.

4. In a lawn mower, wheels including stub axles, vertical end frames mounted upon said axles, a horizontally disposed cross frame made non-continuous and arranged between and carried by the side end frames, a motor plate bridging the frame parts, a motor supported upon said plate, a horizontally disposed main cutter having a vertical shaft passing through said motor plate, a plurality of auxiliary cutters arranged in horizontal alignment with said main cutter, means connected to said motor and cutters for simultaneously driving the latter, means for adjusting said frame, means including lock nuts for fixing its position, and means for adjusting said cutters vertically and independently of said frame and independently of each other.

SAMUEL A. WALLACE.